United States Patent
Ozkan et al.

(10) Patent No.: US 10,211,448 B2
(45) Date of Patent: Feb. 19, 2019

(54) HYBRID NANOSTRUCTURED MATERIALS AND METHODS

(71) Applicant: The Regents of The University of California, Oakland, CA (US)

(72) Inventors: Cengiz S Ozkan, San Diego, CA (US); Mihrimah Ozkan, San Diego, CA (US); Wei Wang, Newport Beach, CA (US)

(73) Assignee: The Regents of the University of California, Oakland, CA (US)

( * ) Notice: Subject to any disclaimer, the term of this patent is extended or adjusted under 35 U.S.C. 154(b) by 120 days.

(21) Appl. No.: 15/034,393

(22) PCT Filed: Nov. 14, 2014

(86) PCT No.: PCT/US2014/065721
§ 371 (c)(1),
(2) Date: May 4, 2016

(87) PCT Pub. No.: WO2015/073834
PCT Pub. Date: May 21, 2015

(65) Prior Publication Data
US 2016/0301066 A1    Oct. 13, 2016

Related U.S. Application Data

(60) Provisional application No. 61/904,979, filed on Nov. 15, 2013.

(51) Int. Cl.
*H01M 4/13*    (2010.01)
*H01M 10/05*    (2010.01)
(Continued)

(52) U.S. Cl.
CPC ......... *H01M 4/133* (2013.01); *H01M 4/0426* (2013.01); *H01M 4/134* (2013.01);
(Continued)

(58) Field of Classification Search
None
See application file for complete search history.

(56) References Cited

U.S. PATENT DOCUMENTS

2008/0211101 A1* 9/2008 Han ................... B82Y 10/00
257/752
2011/0198558 A1    8/2011 Okai et al.
(Continued)

FOREIGN PATENT DOCUMENTS

CN    104247089 A    12/2014
DE    112009000443 B4    5/2017
(Continued)

OTHER PUBLICATIONS

"International Application Serial No. PCT/US2014/065721, Invitation to Pay Additional Fees and Partial Search Report dated Jan. 21, 2015", 2 pgs.
(Continued)

*Primary Examiner* — Scott J. Chmielecki
(74) *Attorney, Agent, or Firm* — Schwegman Lundberg & Woessner, P.A.

(57) ABSTRACT

A hybrid nanostructured surface and methods are shown. In one example the hybrid nanostructured surface is used to form one or more electrodes of a battery. Devices such as lithium ion batteries are shown incorporating hybrid nanostructured surfaces.

11 Claims, 11 Drawing Sheets

(51) Int. Cl.
*H01M 4/133* (2010.01)
*H01M 4/587* (2010.01)
*H01M 10/0525* (2010.01)
*H01M 4/04* (2006.01)
*H01M 4/134* (2010.01)
*H01M 4/1393* (2010.01)
*H01M 4/66* (2006.01)
*H01M 4/02* (2006.01)

(52) U.S. Cl.
CPC ......... *H01M 4/1393* (2013.01); *H01M 4/587* (2013.01); *H01M 4/661* (2013.01); *H01M 10/0525* (2013.01); *H01M 2004/021* (2013.01); *H01M 2004/025* (2013.01); *Y02T 10/7011* (2013.01)

(56) References Cited

U.S. PATENT DOCUMENTS

| | | |
|---|---|---|
| 2011/0281156 A1 | 11/2011 | Boren et al. |
| 2012/0321961 A1 | 12/2012 | Yushin et al. |
| 2013/0177814 A1* | 7/2013 | Rojeski ............... H01M 4/131 429/231.8 |
| 2014/0313636 A1* | 10/2014 | Tour ..................... H01G 11/72 361/502 |

FOREIGN PATENT DOCUMENTS

| | | |
|---|---|---|
| EP | 2780124 A1 | 9/2014 |
| EP | 2820694 A1 | 1/2015 |
| GB | 2512230 A | 9/2014 |
| JP | 2013504162 A | 2/2013 |
| JP | 2015528985 A | 10/2015 |
| KR | 20140094011 A | 7/2014 |
| KR | 20140148399 A | 12/2014 |
| WO | 2013119295 | 8/2013 |
| WO | WO-2013119295 A1 | 8/2013 |
| WO | 2013130677 | 9/2013 |
| WO | 2015073834 | 5/2015 |

OTHER PUBLICATIONS

"International Application Serial No. PCT/US2014/065721, International Search Report dated Mar. 20, 2015", 4 pgs.

"International Application Serial No. PCT/US2014/065721, Written Opinion dated Mar. 20, 2015", 6 pgs.

"International Application Serial No. PCT/US2014/065721, International Preliminary Report on Patentability dated May 26, 2016", 8 pgs.

Chinese Application Serial No. 201480073076.5, Office Action dated Feb. 13, 2018, 15 pgs.

Chinese Application Serial No. 201480073076.5, Response filed Jul. 27, 2018 to Office Action dated Feb. 13, 2018, W/ English Claims, 10 pgs.

Japanese Application Serial No. 2016-530123, Notification of Reasons for Rejection dated Oct. 30, 2018, W/English Translation, 8 pgs.

* cited by examiner

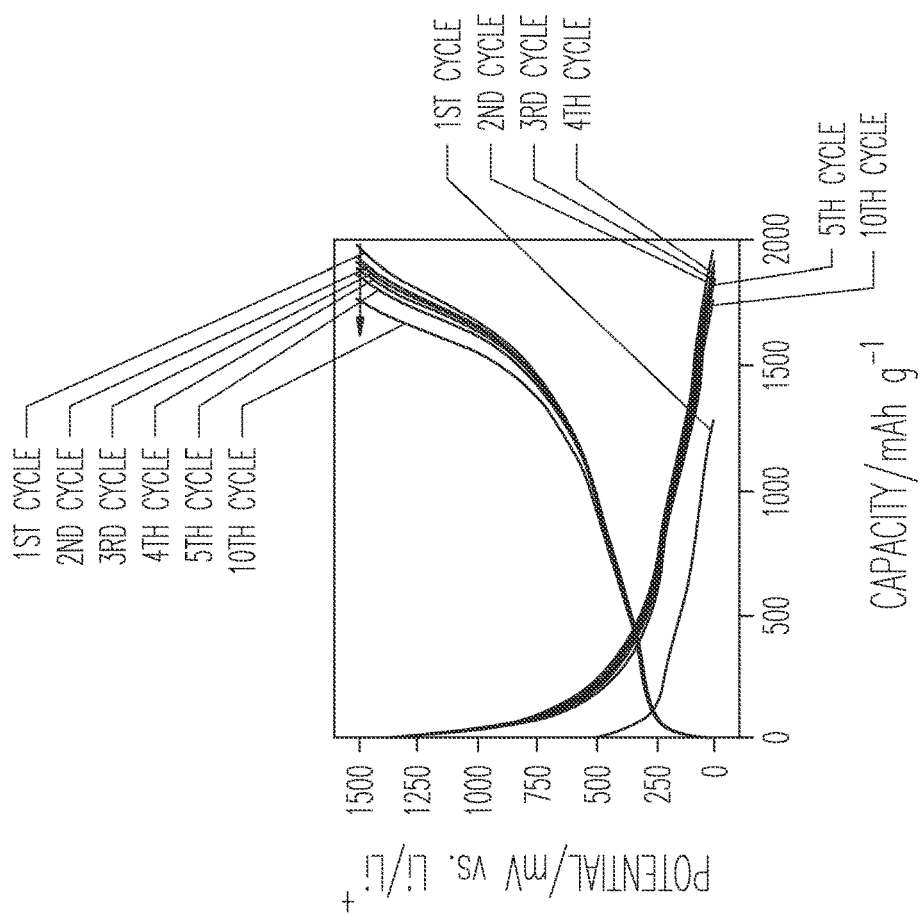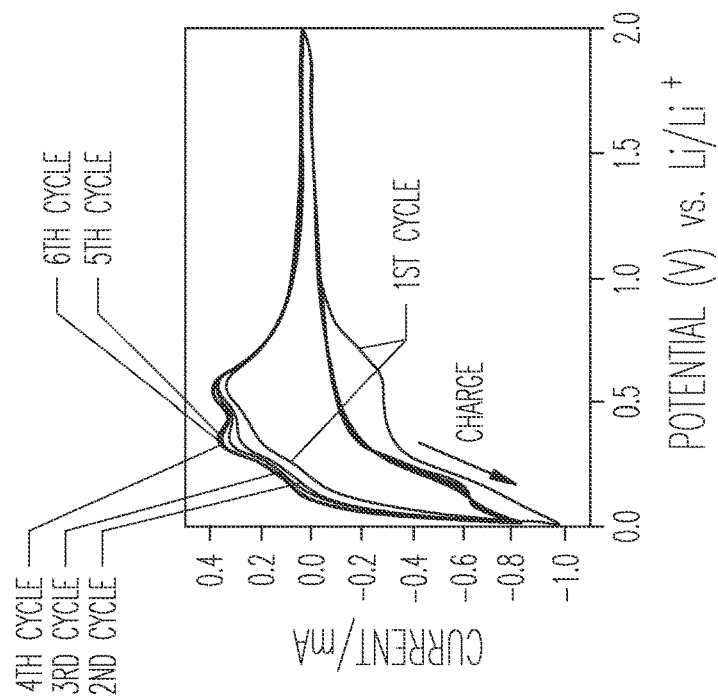
FIG. 5B
FIG. 5A

HYBRID NANOSTRUCTURED MATERIALS AND METHODS

RELATED APPLICATION

This application is a U.S. National Stage Filing under 35 U.S.C. 371 from International Application No, PCT/US2014/065721, filed on Nov. 14, 2014, and published as WO 2015/073834 on May 21, 2015, which claims priority to U.S. Provisional Patent Application No. 61/904,979, entitled "HYBRID NANOSTRUCTURED MATERIALS AND METHODS," filed on Nov. 15, 2013, each of which is incorporated herein by reference in its entirety.

TECHNICAL FIELD

This invention relates to nano structured materials and methods.

BRIEF DESCRIPTION OF THE DRAWINGS

FIG. 5A shows cyclic voltammetry data for an electrode formed using a surface structure according to an example of the invention.

FIG. 5B shows galvanostatic charge-discharge data for an electrode formed using a surface structure according to an example of the invention.

DETAILED DESCRIPTION

Figure 1:
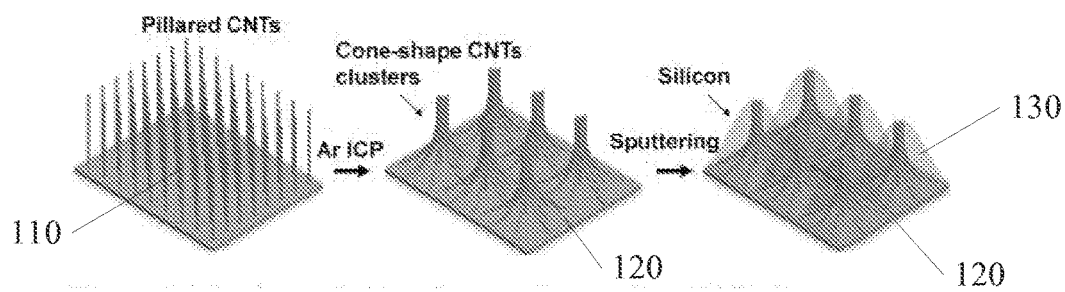
FIG. 1 shows stages of fabrication of silicon coated structures according to an example of the invention.

In the following detailed description, reference is made to the accompanying drawings which form a part hereof, and in which is shown, by way of illustration, specific embodiments in which the invention may be practiced. These embodiments are described in sufficient detail to enable those skilled in the art to practice the invention. Other embodiments may be utilized and structural, or logical changes, etc. may be made without departing from the scope of the present invention.

As a rechargeable battery, lithium ion batteries (LIBs) are commonly seen in daily life such as portable electronic devices, and electrical vehicles (EVs). Batteries in EV applications end up being a significant portion of the total vehicle mass; the volume of battery cell in portable electronics also limits the trend of down-sizing. High energy and power densities, long cycling life, cheaper rechargeable lithium-ion batteries (LIBs) are becoming highly desired for the development of portable electronics and low-emission environmental friendly electric vehicles (EVs). Conventional battery anodes may be made of intercalation-based carbonaceous materials due to their exceptional physical and chemical properties, including high conductivity, very good electrochemical stability, high surface area, excellent life time (~5000 cycles) and coulombic efficiency (100%) etc. However, the intercalation-mechanism limits the theoretical capacitance value of graphite-based lithium ion battery anode to be ~372 mAh g−1 since theoretically every six carbon atoms can bond with one lithium ion. Though nano structured carbonaceous materials such as graphene, CNT, activated and template-derived carbon, may augment the capacitance dramatically due to their large surface area, their capacitances are still mostly limited to be <1000 mAh g−1. Silicon is a type of anode material that receives a lot of attention due to its highest known theoretical capacity value (~4200 mAh g−1). For a packaged battery full-cell, the total capacitance $C_{Total}=1/(1/C_{cathode}+1/C_{anode})$, where $C_{cathode}$, $C_{anode}$ are the capacitance of cathode and anode, respectively. Thus, if based on $LiCoO_2$ capacity (~274 mAh g−1), replacement of the commonly used graphite anode with state-of-art silicon anode will potentially result a 63% increase of total cell capacity.

One obstacle that delays the application of silicon anode is its large volume changes by up to 400% during the Li—Si alloying and dealloying process. Bulk form or micron meter size silicon systems may show very fast capacity fading with cycling (~1% each cycle). At the same time, nano-meter size high surface area silicon systems may suffer with a large solid electrolyte interface (SEI) layer formation. The as formed SEI layer will crack due to volume expansion, and repeatedly generated SEI layers may soon kill the performance of whole electrode.

Some alternative systems are prepared by mixing active materials with a polymer binder (PVDF or Algae) and then casting on to conductive substrates, such as copper, nickel, aluminum, etc. This type of electrode inherently limits the performance of active material due to the relatively poor electrical and thermal conductivity caused by the contact resistance between individual particles and the polymer binder. Three dimensional graphene and CNT hybrid nano-structures may be good candidates for fast charging-discharging energy storage applications such as supercapacitors and battery anodes. In one example, an innovative three-dimensional (3D) silicon decorated cone-shape CNT clusters (Si-CCC) architecture is shown. In one example the architecture can be used for the application of a lithium ion battery anode.

The pillared CNT and graphene nanostructure (PGN) was grown via a two-step chemical vapor deposition on copper foil, which is a commonly used battery anode current collector in the battery industry. Pillared CNTs are conformally grown on single/bilayer graphene covered copper foil and treated with ICP Ar plasma. We discovered that the CNT pillars tend to bundle together to form cone-shape CNT clusters for the very first time. This type of 3D Si-CCC architecture has several advantages. (1) The seamless connection of graphene and pillared CNTs provides relatively facilitates the charge and thermal transfer in the electrode system. (2) The cone-shape nature of the Si-CCC architecture offers small interpenetrating channels for faster electrolyte access into the electrode which may enhance the rate performance. (3) The Si-CCC architecture is a binder-free technique for preparing electrodes for LIBs. LIB half cells are fabricated based on as-synthesized Si-CCC electrodes. A very high reversible capacity is achieved, and minimal fading of capacity was observed.

A detailed schematic illustration of the synthesis process of the silicon decorated cone-shape CNT clusters (Si-CCC) is shown in FIG. 1. Firstly, the pillared carbon nanotube (CNT) and graphene nanostructure (PGN) 110 was grown via ambient pressure chemical vapor deposition (CVD) directly on a 20 μm-thick copper foil which is typically used as a current collector for anodes in the battery industry. Next a mild inductively coupled plasma (ICP) Argon milling was applied to the as-grown PGN structure. The pillared CNTs were observed to be bundled together to form cone-shape CNT clusters (CCC) 120 after Ar plasma treatment. Lastly, a variable thickness of amorphous silicon 130 was deposited on top of the cone-shape CNT cluster by magnetron sputtering deposition technique.

Figure 2:
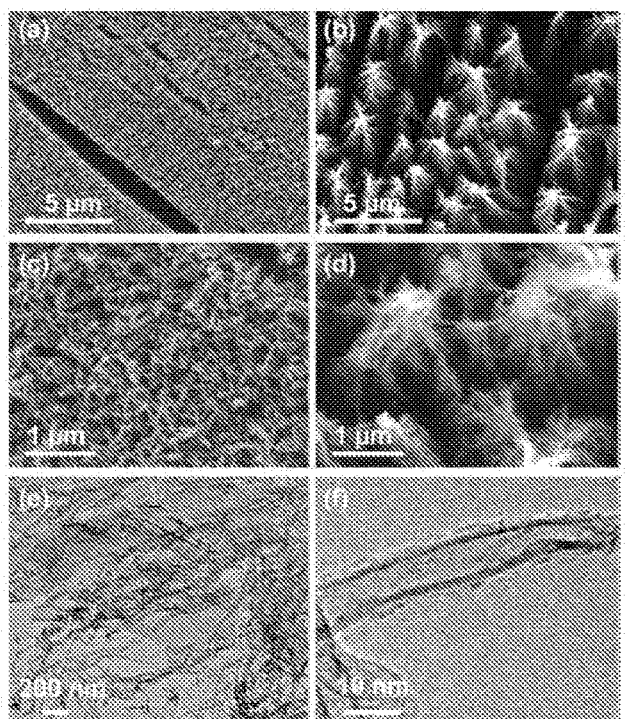
FIG. 2A-F shows scanning electron microscope (SEM) images of a number of surface structures according to an example of the invention.

Scanning electron microcopy (SEM) images are shown to characterize the morphologies of the as-grown PGN and CCC nanostructures (FIG. 2a-d). FIG. 2a shows the top-view SEM micrograph of the PGN sample. Vertically aligned, densely packed CNTs are grown on the graphene covered copper foil. A high magnification top-view SEM image of the PGN shows a tangled CNT network together with traceable amount of Fe catalysts on the top surface of the pillared CNT carpet (FIG. 2c). To remove the tangled CNT network and excessive catalyst particles, ICP Ar plasma was applied to mill them away. After the milling of ICP Ar plasma, besides removal of the tangled CNTs and Fe catalysts, a unique and innovative cone-shape carbon nanotube clusters (CCCs) were observed (FIGS. 2b and 2d).

This two-step CVD growth method enables a very good control of the thickness of the graphene layer. Transmission electron microscopy (TEM) was performed to further confirm the quality of the as-grown PGN. FIG. 1e demonstrate the low-magnification TEM image of PGN, it is obvious to see transparent layer of graphene film together with CNTs with uniform size. The as-grown pillared CNTs have an average diameter around 5-10 nm with a wall thickness of about 2 layers and inner diameter around 5 nm as determined by direct high resolution transmission electron microscopy (HRTEM) (FIG. 2f).

Figure 3:
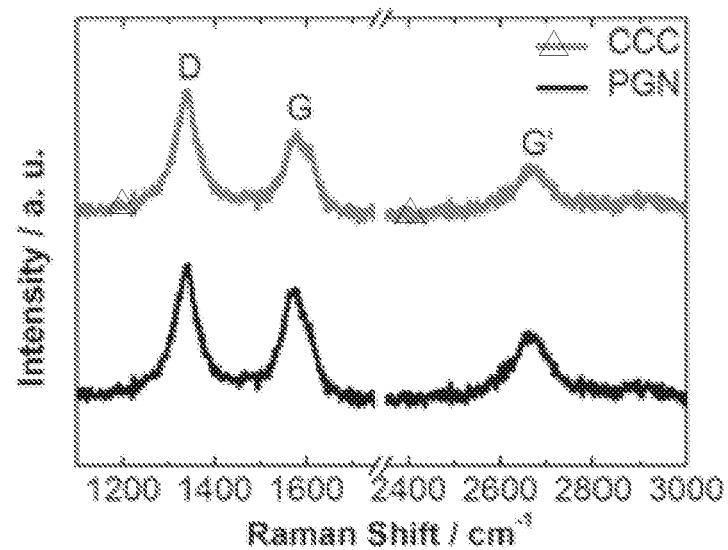
FIG. 3 shows a Raman spectra of surface structures according to an example of the invention.

Raman spectroscopy is performed to characterize the as-grown PGN and CCC nano structure (FIG. 3). Raman spectra features collected from the PGN and CCC are in good agreement with the CNT Raman spectra, which clearly shows the presence of the intense D band centered around 1340 $cm^{-1}$. The intensity of the D band is relatively higher compared to that of the G band centered around 1572 cm−1. The 2D band for CNTs centered at ≈2662 $cm^{-1}$ is a single peak which is similar to that of graphene. The presence of the intense D band in the spectrum is associated with defects of the CNTs. The CCC nanostructure shows apparently higher I D/I G (≈1.35) than the PGN sample (≈1.15), which suggests that the CCC nano structures are more disordered than PGN. We believe the increased disorderness is due to the formation of defects on the surface of CNTs during Ar ICP treatment which may play an important role in the change of surface tension.

Figure 4:
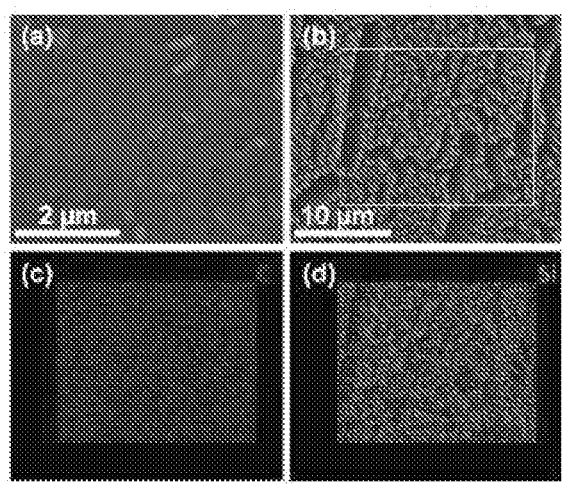
FIG. 4A-D shows scanning electron microscope (SEM) images and electron dispersive spectroscopy (EDS) data of a number of surface structures according to an example of the invention.

Due to the curly nature of the tangled CNTs on top of PGN, sputtered silicon tends to condense on the carpet to form a bulk layer of silicon (FIG. 4a). Sputtered Si on top of CCC still preserves it cone-shape nature which facilitates the electrolyte-electrode interface by providing channels (FIG. 4b). To investigate the uniformity of the silicon deposition process, energy dispersive spectroscopy (EDS) was performed together with the SEM imaging on the selected area marked in FIG. 4b. EDS spectra of the silicon decorated CCC nanocomposite structure shows very strong C, Si peaks together with traceable amount of Cu which is from the copper foil substrate. EDS element analysis of C and Si suggest a very uniform distribution of CNTs and Si on the surface which indicates a good quality of materials preparation (FIG. 4c-d).

Figure 5C:
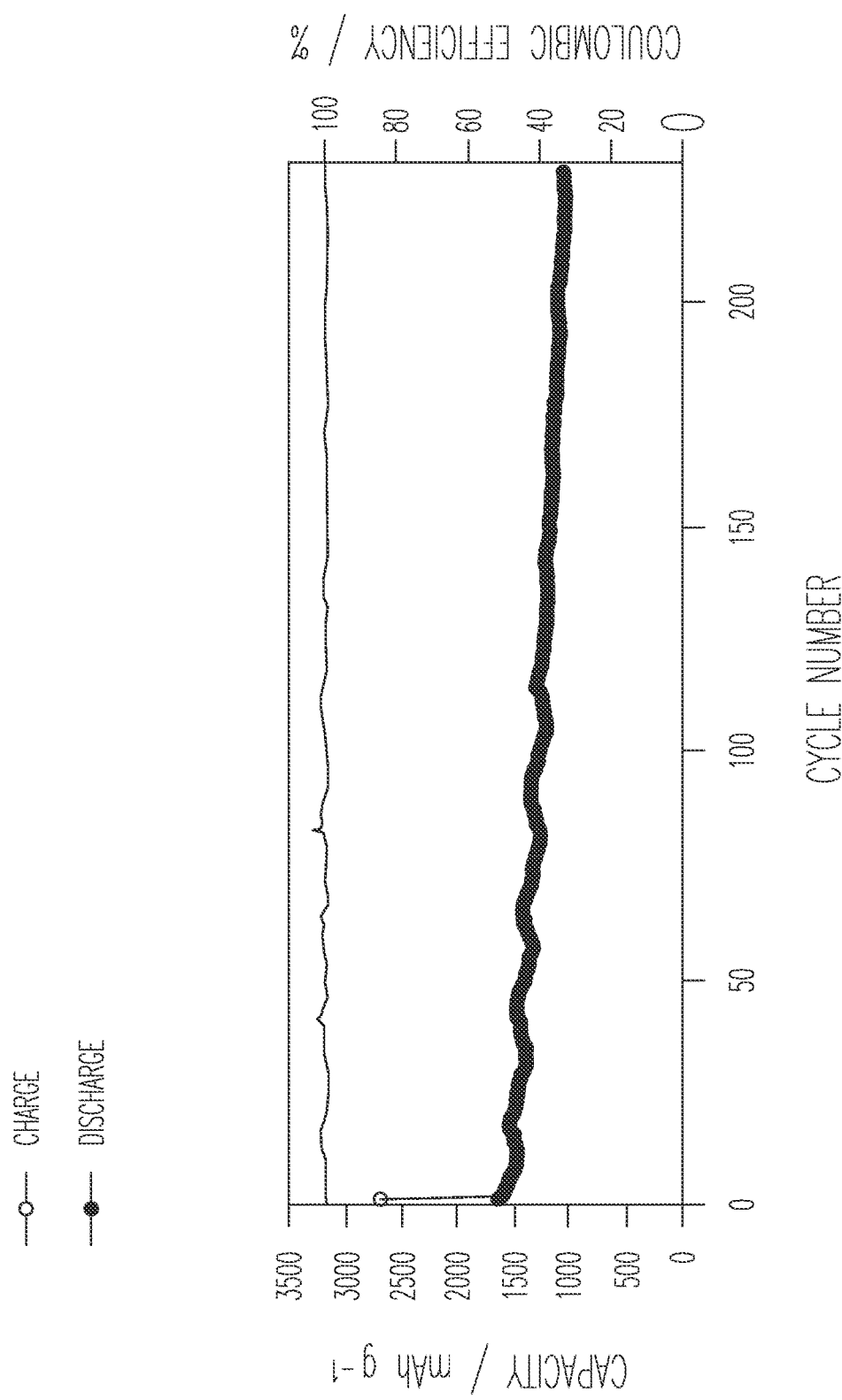
FIG. 5C shows cycling performance and coulombic efficiency data for an electrode formed using a surface structure according to an example of the invention.
Figure 5D:
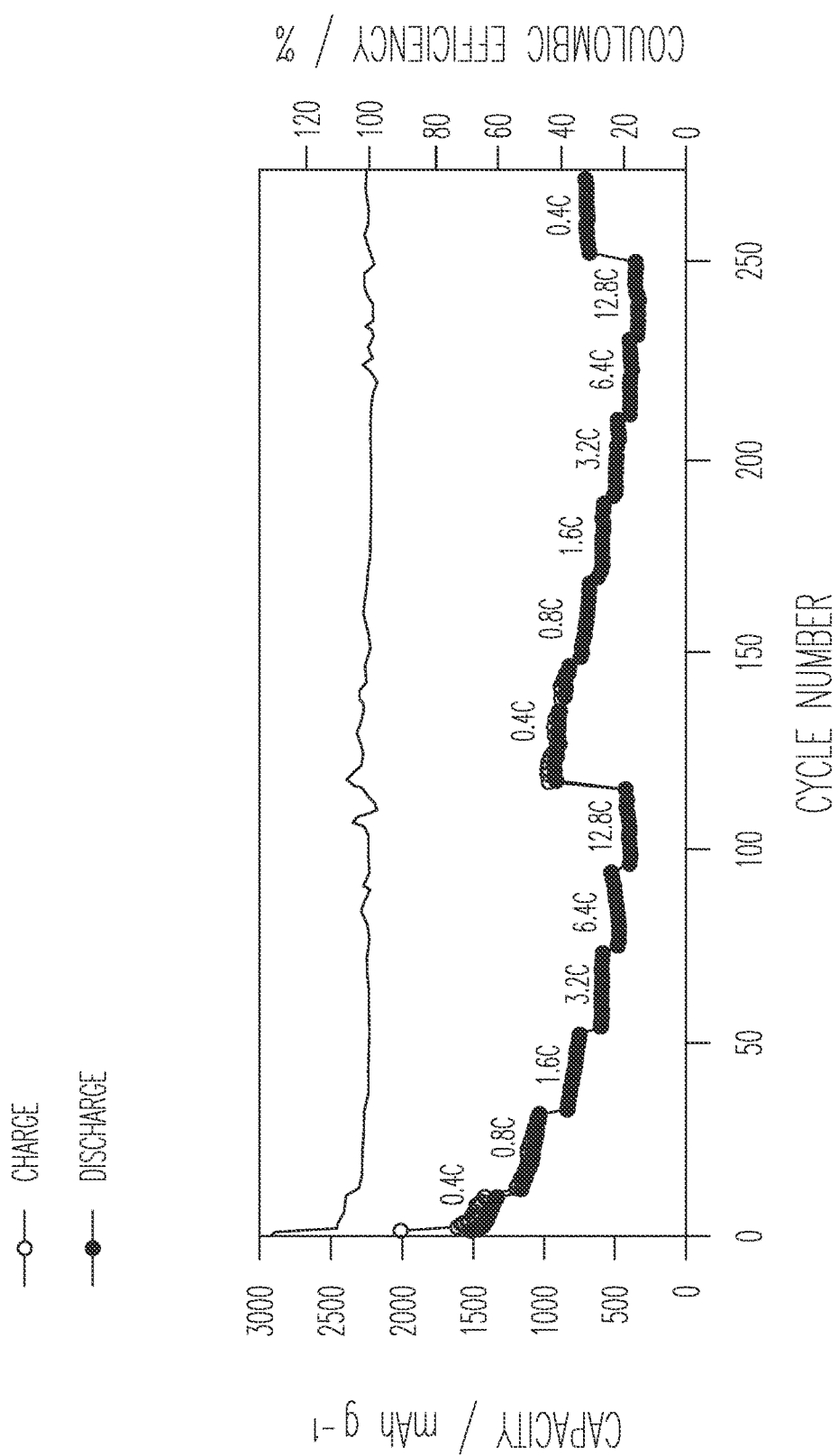
FIG. 5D shows high rare cycling performance and coulombic efficiency data for an electrode formed using a surface structure according to an example of the invention.

Button-type half-cell batteries were assembled in an Ar-filled glove box ($O_2$<1 ppm, moisture<1 ppm) with Si-CCC electrodes as the anodes and pure lithium metal chip as the counter electrodes. FIG. 5a shows the cyclic voltammogram of the Si-CCC electrode for the first six cycles at a scan rate of 0.2 mV $sec^{-1}$. Two reduction peaks upon $1^{st}$ charge process are associated with the formation of solid-electrolyte-interface (SEI) layer (0.5-0.7 V) and Li—Si alloying (<0.33 V). After $1^{st}$ charge, the current-potential characteristics are becoming approximately consistent. FIG. 5b shows the LIB with a PGN electrode tested at a current density of 0.4 C with a voltage range between 0.01 V and 1.5 V for the first ten cycles. The Si-CCC electrode exhibits a reversible discharge capacity of 1644.4 mAh g−1 in the $1_{st}$ cycle and the following 10 cycles faded slightly ($2_{nd}$ cycle: 1605.6 mAh g−1, $3_{rd}$ cycle: 1583.3 mAh g−1, $10_{th}$ cycle: 1472.2 mAh g−1). Though obvious fading of the Si-CCC structure was observed which is in accordance with other previously reported silicon anodes, after 230 cycles the capacitance level is still ~1050 mAh $g_{-1}$ which is much higher than the previously reported PGN electrodes and other carbonaceous electrodes (FIG. 5c). The columbic efficiency attained for all cycles is around 100% from the second cycle. We believe the irreversible discharge capacitance for the first charge is due to the formation of SEI layer on the surface of Si-CCC. FIG. 5d shows the rate performance of the Si-CCC anode LIB. With the increase of charge-discharge current density from 0.4 C to 12.8 C, capacities decrease from ~1612 mAh $g_{-1}$ to ~400 mAh $g_{-1}$, respectively. If we compare $120_{th}$ cycle of FIGS. 5c and 5d, capacitance of 1244 mAh $g_{-1}$ and 972 mAh $g_{-1}$ are achieved respectively.

Figure 6A:
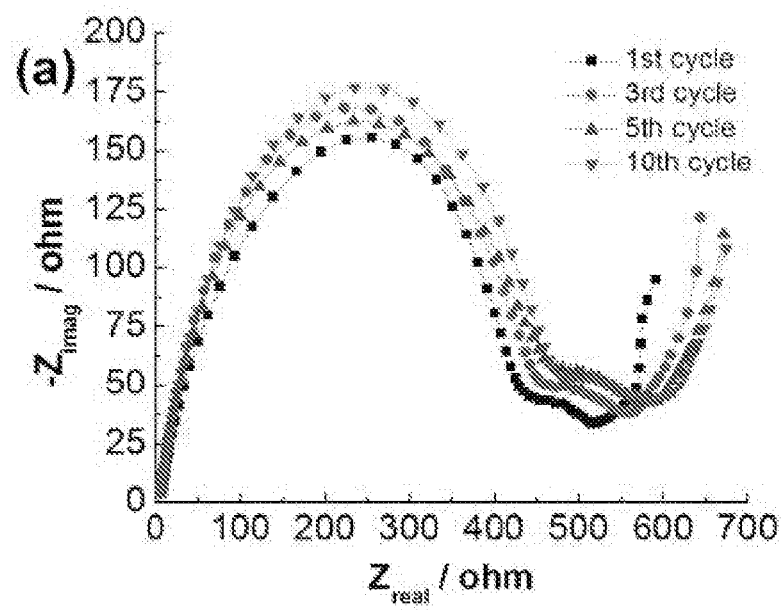
FIG. 6A shows electrochemical impedance spectroscopy (EIS) data for an electrode formed using a surface structure according to an example of the invention.

Electrochemical impedance spectroscopy (EIS) study was further performed to confirm the stability of this Si-CCC nanocomposite electrode. FIG. 6A shows the EIS plots of Si-CCC nanocomposite electrode with cycling, an slight increase of the diameter of semicircle was observed between the $1_{st}$ and the $3_{rd}$ cycle. However, the change in impedance hereafter (from $3_{rd}$ cycle to $10_{th}$ cycle) is relatively less pronounced, signifying that the anode tends to stabilize as it is repeatedly cycled.

Figure 6B:
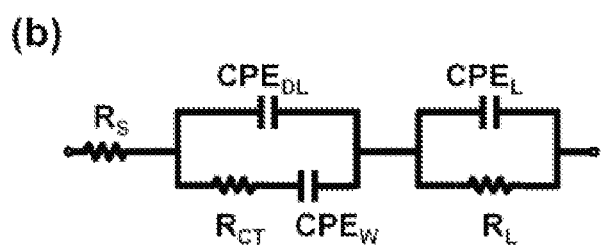
FIG. 6B shows an equivalent circuit of the EIS data from FIG. 6A for an electrode formed using a surface structure according to an example of the invention.

The equivalent circuit used for fitting is shown in FIG. 6b. The high frequency intercept, commonly interpreted as ESR (equivalent series resistance) or $R_S$, relates to the ohmic portion of the electrode impedance and includes contributions from the electronic conductivity of the electrodes and ionic conductivity of the electrolyte solution, as well as any electronic contact resistances associated with the cell hardware, current collectors, and electrode materials.

Figure 6C:
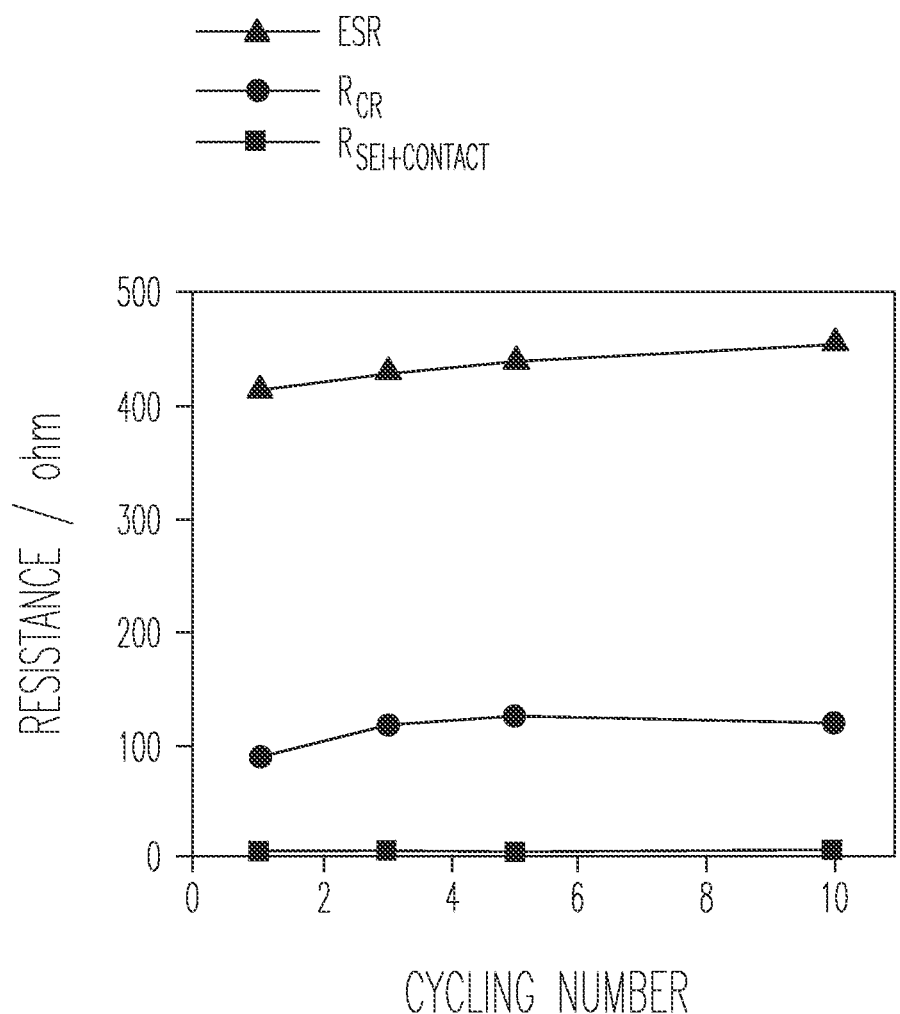
FIG. 6C shows resistance data for an electrode formed using a surface structure according to an example of the invention.
Figure 7:
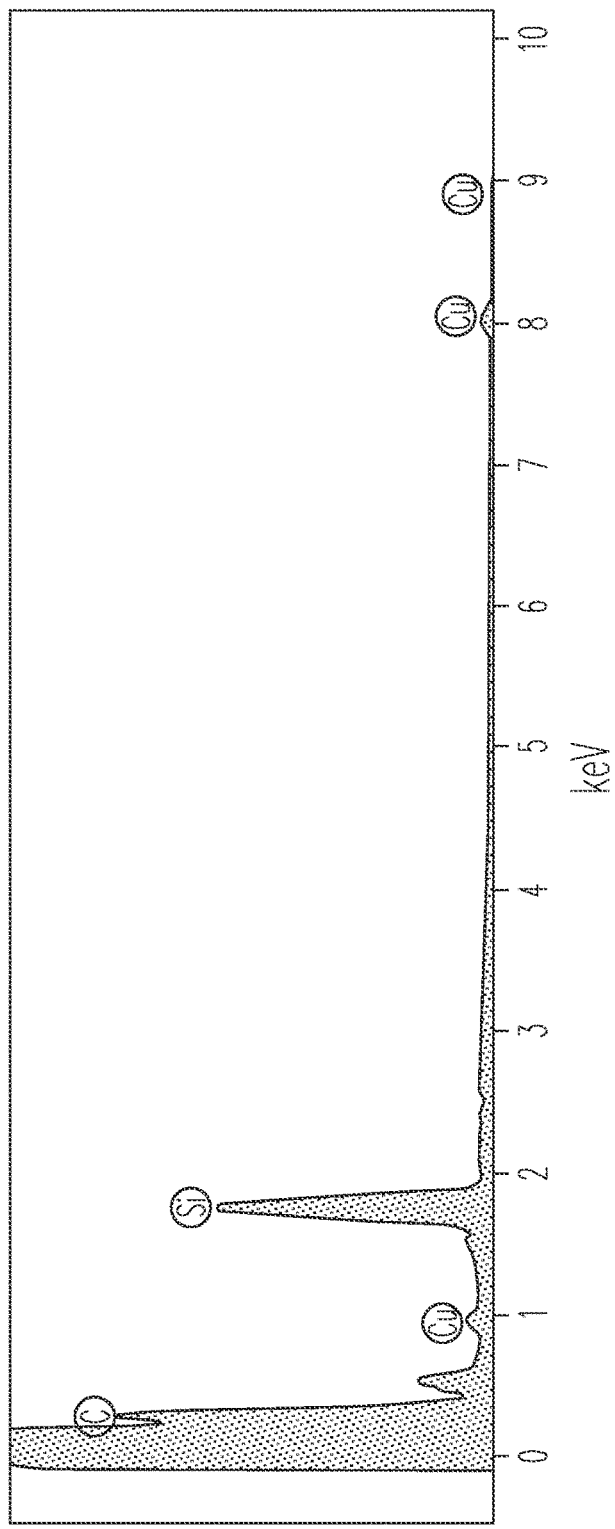
FIG. 7 shows electron dispersive spectroscopy (EDS) data for a surface structure according to an example of the invention.
Figure 8:
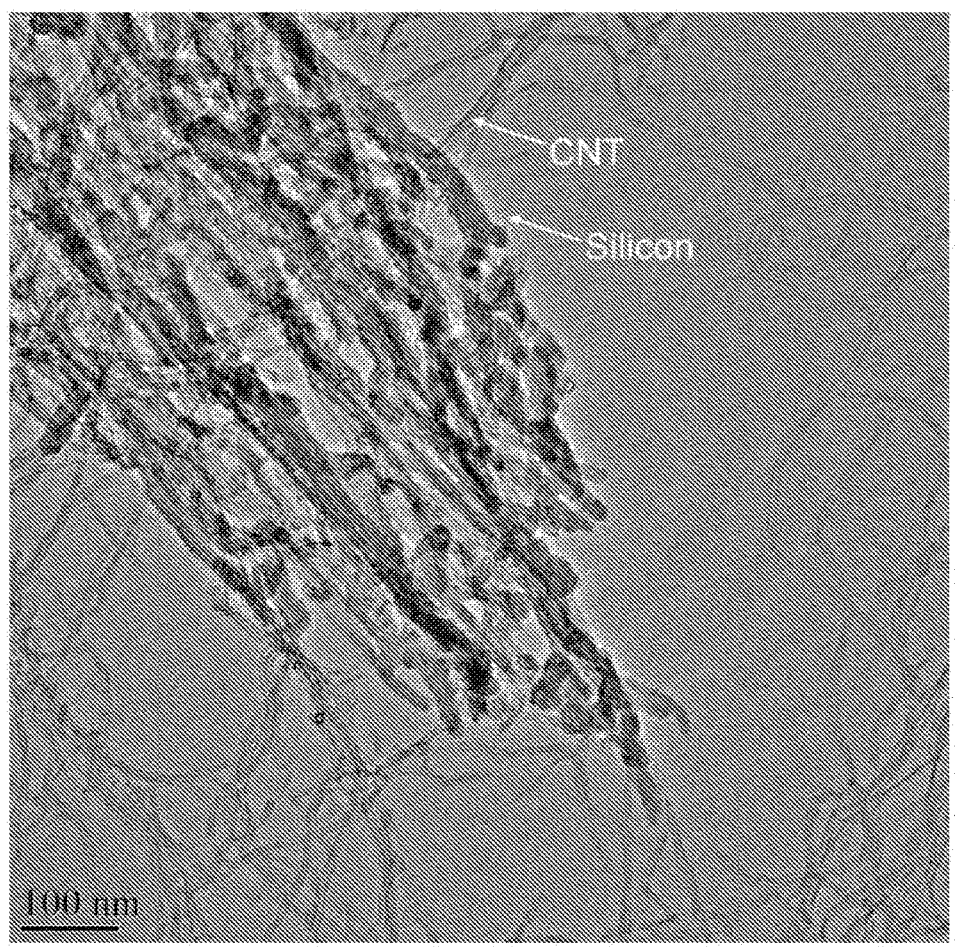
FIG. 8 shows a transmission electron microscope (TEM) image for a surface structure according to an example of the invention.
Figure 9:
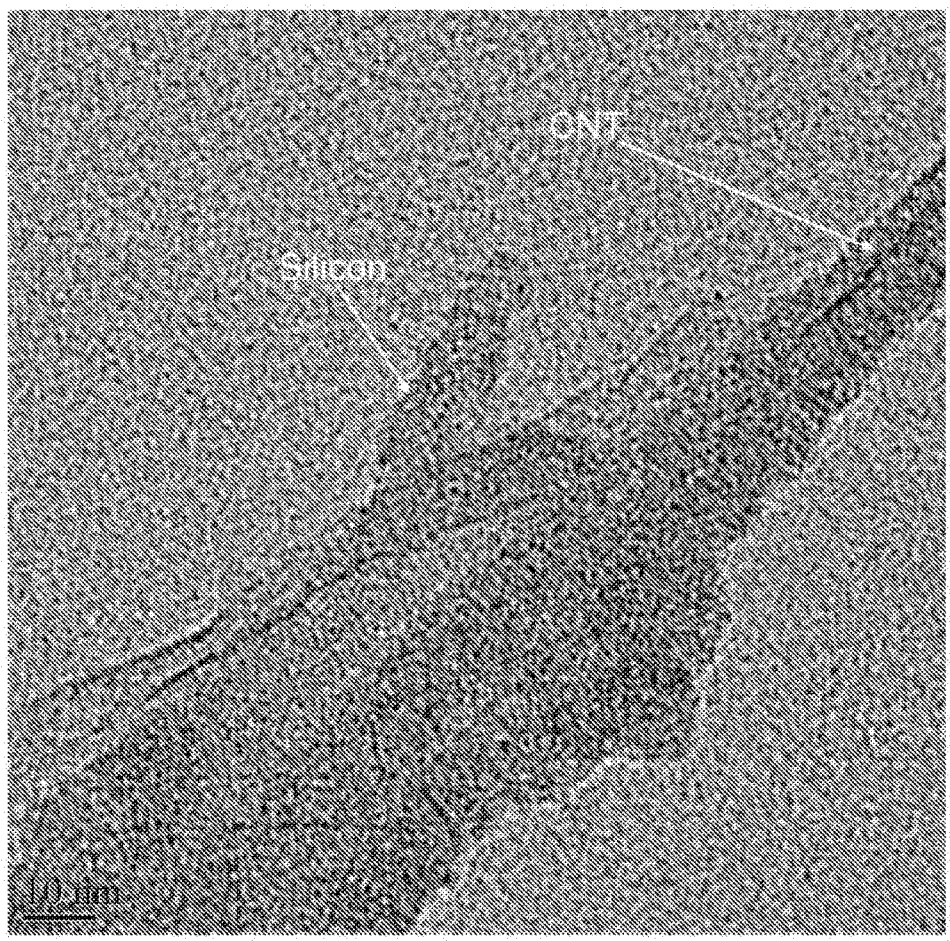
FIG. 9 shows a high resolution transmission electron microscope (HRTEM) image for a single surface structure according to an example of the invention.
Figure 10:
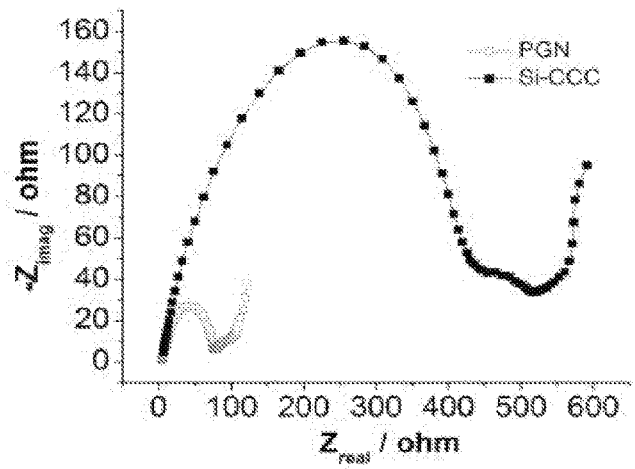
FIG. 10 shows electrochemical impedance spectroscopy (EIS) data for various components of a surface structure according to an example of the invention.

Silicon anode batteries, albeit possessing very high theoretical energy density, may suffer stability issues due to expansion of electrode structure during lithiation. Particle to particle contact diminishes after each cycle due to the consequent volume change. This mechanical failure inside the electrode can lead to detrimental effects in cycling efficiency, lifetime, and rate capability. Impedance due to particle to particle contact and SEI layer formation remains stable with increasing number of cycles, as evident in FIG. 6c. R SEI+INT increased 9.6% from the $1^{st}$ cycle to the $10^{th}$ cycle.

Therefore, contact impedance among the active particles and the current collector is not significantly affected by cycling. An anode formed according to an embodiment of the present invention is not affected by the volume expansion of a typical Si-based anode. It also shows that SEI layer formation stabilizes after the $1^{st}$ cycle and further supports the stability of this electrode. $R_{CT}$ experiences a 30% increase between the $1^{st}$ cycle and the $3^{rd}$ cycle. However, it only increases by 5.9% between the $3^{rd}$ and the $5^{th}$ cycle, and decreases by 4% between the $5^{th}$ and the $10^{th}$ cycle. All of these findings show superior stability for an electrode formed according to examples described in the present disclosure. Impedance due to interfacial contact and SEI formation is higher for the SCCC system compared to pure PGN system. This is due to the presence of silicon in the SCCC system, which inherently increases impedance due to SEI formation and contact.

In summary, an innovative surface, including silicon decorated cone-shape CNT clusters (Si-CCC) is shown. One application of the innovative surface includes the application of lithium ion battery anode. The silicon decorated cone-shape CNT clusters are conformally coated onto the graphene covered copper foils. The seamless connection between silicon decorated CNT cones and graphene facilitates the charge transfer in the system and suggests a binder-free technique of preparing LIB anodes. A very high reversible capacity of 1644.4 mAh $g_{-1}$ was achieved, which is dramatically higher than other graphitic systems including pillared CNT and graphene nanostructure (PGN)~900 mAh g-1. The LIB anodes based on Si-CCC show excellent cycling stability (preserves >1000 mAh $g_{-1}$ capacity with 100% coulombic efficiency after 230 cycles).

Figure 11:
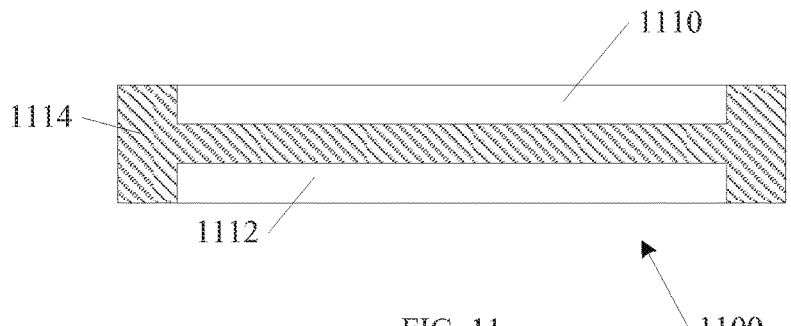
FIG. 11 shows a battery according to an example of the invention.

FIG. 11 shows an example of a battery 1100 according to an embodiment of the invention. The battery 1100 is shown including an anode 1110 and a cathode 1112. An electrolyte 514 is shown between the anode 1110 and the cathode 1112. In one example, the battery 1100 is a lithium-ion battery. In one example, the anode 1110 is formed from one or more silicon coated structures as described in examples above. In one example, although the invention is not so limited, the battery 1100 is formed to comply with a 2032 coin type form factor.

Figure 12:
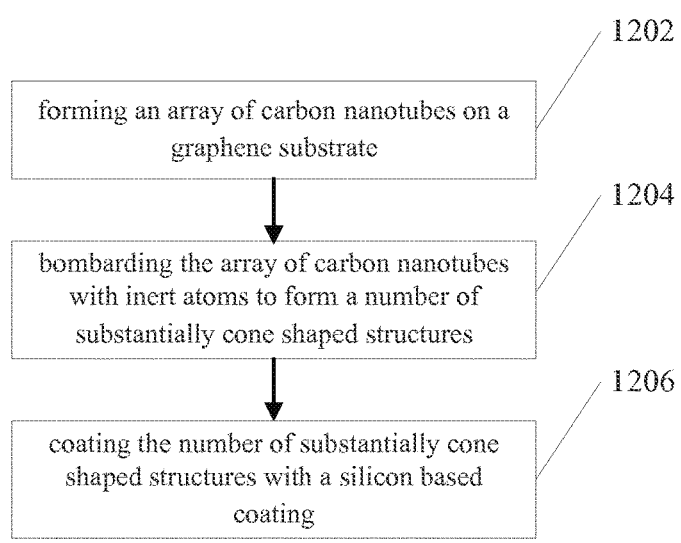
FIG. 12 shows a method of forming a surface structure according to an example of the invention.

FIG. 12 shows an example method of forming a material according to an embodiment of the invention. In operation 1202, an array of carbon nanotubes is formed on a graphene substrate. In operation 1204, the array of carbon nanotubes is bombarded with inert atoms to form a number of substantially cone shaped structures. In operation 1206, the number of substantially cone shaped structures is coated with a silicon based coating. In one example, the silicon coated structure formed is further incorporated into an electrode of a battery. In one example, the electrode is an anode. In one example, the battery is a lithium ion battery.

EXAMPLES

Materials Synthesis:

Pillared CNT and graphene nano structure (PGN) is grown through an ambient pressure chemical vapor deposition (APCVD) method using a mixture of C2H4 and $H_2$ on 20 μm thick copper foil, which is typically used as the current collector for anodes in the battery industry. The copper foil is cleaned and annealed to make sure the surface is free of contaminations, release residual stress in the foil, enlarge the average grain size and flatten the surface. Methane was introduced in the heat-treatment process to form a very thin layer of graphene film on the copper surface. Next, 1-5 nm Fe catalysts are deposited on the surface of Cu foils by e-beam evaporation (Temescal, BJD-1800). The graphene covered copper foils with catalyst particles are heated to 750° C. under ambient pressure in an Ar/H2 atmosphere, and $C_2H_4$ is introduced to trigger and continue the growth of pillared CNTs on the graphene covered copper foil. After growth, the chamber is cooled to room temperature. The silicon thin films were sputter-deposited (ATC Orion Sputtering System, AJA International, Inc.) onto the given substrates with RF power of 270 W and processing pressure of 5 mTorr. The base pressure prior to each deposition was below 8×10−7 Torr. All depositions were carried out at sample temperature and rotation of ~20° C. and ~10 RPM, respectively. The resulting deposition rate of 0.571 Å/s was determined via AFM measurements of photolithographically-defined features.

Materials Characterization:

The surface morphology is investigated using optical microscopy, scanning electron microscopy (SEM; leo-supra, 1550), and transmission electron microscopy (TEM; Philips, CM300) with a LaB6 cathode operated at 300 kV. For TEM imaging, the sample is ultrasonically dispersed in ethanol for 1 hr and then diluted and dropped onto a TEM grid. A Renishaw DXR Raman spectroscopy system with a 532 nm laser (8 mW excitation power, 100× objective lens) source is used to characterize the as-grown pillared CNT and graphene nano structure.

Fabrication and Testing of Lithium Ion Battery (LIB):

A button-type (CR 2032) two-electrode half cell configuration was used for the electrochemical measurements. The LIBs were assembled in an Ar filled glovebox with moisture and oxygen level below 1 ppm. Pillared CNT and graphene nano structure covered copper foils and pure lithium metal were used as the anode and counter electrode of the LIB, respectively. A porous membrane (Celgard 3501) was used as the separator. In this work, 1 M LiPF6 dissolved in a 1:1 (v:v) mixture of ethylene carbonate (EC) and dimethyl carbonate (DMC) was used as the electrolyte. Galvanostatic charge-discharge and cycling performance measurements were conducted at a fixed voltage window between 0.01 V and 3.0 V (vs. Li+/Li).

To better illustrate the method and device disclosed herein, a non-limiting list of embodiments is provided here:

Example 1 includes a surface structure, including a number of carbon nanotubes protruding from a graphene substrate, wherein the carbon nanotubes form a number of substantially cone shaped structures, and a silicon based coating formed over the number of substantially cone shaped structures.

Example 2 includes the surface structure of example 1, wherein the silicon based coating is substantially pure silicon.

Example 3 includes the surface structure of any one of examples 1-2, further including a metallic conductor layer coupled beneath the graphene substrate.

Example 4 includes the surface structure of any one of examples 1-3, wherein the metallic conductor layer includes copper.

Example 5 includes a battery, including a pair of electrodes. The electrodes include an anode and a cathode, wherein at least one of the pair of electrodes includes a number of carbon nanotubes protruding from a graphene substrate, wherein the carbon nanotubes form a number of substantially cone shaped structures, a silicon based coating formed over the number of substantially cone shaped structures, and an electrolyte between the anode and the cathode.

Example 6 includes the battery of example 5, wherein one of the pair of electrodes includes a lithium compound to form a lithium ion battery.

Example 7 includes the battery of any one of examples 5-6, further including a copper conductor layer coupled beneath the graphene substrate.

Example 8 includes a method that includes forming an array of carbon nanotubes on a graphene substrate, bombarding the array of carbon nanotubes with inert atoms to form a number of substantially cone shaped structures, and coating the number of substantially cone shaped structures with a silicon based coating.

Example 9 includes the method of example 8, wherein bombarding the array of carbon nanotubes with inert atoms includes inductively coupled plasma argon milling the array of carbon nanotubes.

Example 10 includes the method of any one of examples 8-9, wherein coating the number of substantially cone shaped structures includes sputter depositing an amorphous silicon layer on the number of substantially cone shaped structures.

Example 11 includes the method of any one of examples 8-10, further comprising forming a first electrode from the coated substantially cone shaped structures.

Example 12 includes the method example 11, further comprising coupling a second electrode adjacent to the first electrode with an electrolyte separating the first and second electrodes to form a battery.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A surface structure, comprising:
   a number of carbon nanotubes protruding from a graphene substrate, wherein the carbon nanotubes form a number of substantially cone shaped structures wherein the number of substantially cone shaped structures are electrically coupled together to operate as a single electrode, each cone shaped structure formed from a plurality of bundled carbon nanotubes; and
   a silicon coating formed over the number of substantially cone shaped structures.

2. The surface structure of claim 1, further including a metallic conductor layer coupled beneath the graphene substrate.

3. The surface structure of claim 1, wherein the metallic conductor layer includes copper.

4. A battery, comprising:
   a pair of electrodes, including an anode and a cathode, wherein at least one of the pair of electrodes includes:
   a number of carbon nanotubes protruding from a graphene substrate, wherein the carbon nanotubes form a number of substantially cone shaped structures wherein the number of substantially cone shaped structures are electrically coupled together to operate as a single electrode, each cone shaped structure formed from a plurality of bundled carbon nanotubes;
   a silicon coating formed over the number of substantially cone shaped structures; and
   an electrolyte between the anode and the cathode.

5. The battery of claim 4, wherein one of the pair of electrodes includes a lithium compound to form a lithium ion battery.

6. The battery of claim 4, further including a copper conductor layer coupled beneath the graphene substrate.

7. A method, comprising:
   forming an array of carbon nanotubes on a graphene substrate;
   bombarding the array of carbon nanotubes with inert atoms to form a number of substantially cone shaped structures; and
   coating the number of substantially cone shaped structures with a silicon based coating.

8. The method of claim 7, wherein bombarding the array of carbon nanotubes with inert atoms includes inductively coupled plasma argon milling the array of carbon nanotubes.

9. The method of claim 7, wherein coating the number of substantially cone shaped structures includes sputter depositing an amorphous silicon layer on the number of substantially cone shaped structures.

10. The method of claim 7, further comprising forming a first electrode from the coated substantially cone shaped structures.

11. The method of claim 10, further comprising coupling a second electrode adjacent to the first electrode with an electrolyte separating the first and second electrodes to form a battery.

* * * * *